Patented Dec. 9, 1947

2,432,389

UNITED STATES PATENT OFFICE 2,432,389

CELLULAR PRODUCTS

Lawrence E. Daly, Osceola, Ind., assignor to United States Rubber Company, New York, N. Y., a corporation of New Jersey No Drawing. Application November 20, 1945, Serial No. 629,910

3 Claims. (Cl. 260—29)

This invention relates to the manufacture of light weight multicellular products.

This case is a continuation-in-part of my application Serial No. 510,911, filed November 19, 1943.

An object of the invention is to provide a multicellular product of very light weight, i. e., of 3 pounds or less per cubic foot, and specifically of less than 2 pounds per cubic foot. A further object is to provide such a product which will have excellent insulating and acoustic properties, and which will also be resilient and capable of absorbing vibrations. A still further object is to provide such a product which will have increased resistance to burning. Other objects will be apparent from the hereinafter detailed description.

According to the invention, a homogeneous aqueous emulsion comprising a water-soluble urea-formaldehyde resin, an acrylic resin which is derived from an acrylic ester of a lower aliphatic alcohol, and a vinyl resin derived from a vinyl ester of a lower aliphatic acid (e. g., polyvinyl acetate) is prepared with the aid of any suitable emulsifying and frothing agent, which will emulsify and also froth the emulsion at a pH in the range from 3.5 to about 6.8, i. e., insufficiently acid to cause gelling. The vinyl resin, e. g., polyvinyl acetate, is available in emulsion form, the average molecular weight, generally, ranging from 5,000 to 20,000. The acrylic resin has a molecular weight, increasing with its degree of polymerization, and for the purposes of the present invention should be such that its viscosity will enable it to be emulsified in water, for example, one having a molecular weight of less than 25,000, although certain polyacrylates may range for this purpose up to 40,000. The nature of these esters of acrylic acid and methacrylic acid, has been known for some time; see vol. 28, page 267 of Industrial & Engineering Chemistry (1936). A number of said frothing agents are known, among them being sulfonated long-chain alcohol or fatty alcohol sulfate soaps, sodium alkyl sulfates, reaction products of alkylene oxides with aliphatic alcohols, etc. In addition, a normally liquid chlorinated organic solvent consisting of chlorine attached to a radical selected from the class consisting of carbon and hydrocarbon and which is removable on drying the form, for example, a chlorinated aliphatic solvent of less than 150° C. boiling point, and one preferably having a boiling point in the range between 50° C. and 140° C., may be added to strengthen the foam and increase the relative volume. The chlorinated solvent may generally range from 5 to 50 parts, by weight, based on 100 parts (dry weight) of the resins, although higher amounts may be used. The solvent also progressively stiffens and stabilizes the foam while it is being frothed to the desired density.

The emulsion mixture is placed in a suitable frothing machine, such as a Hobart mixer, and frothed to a predetermined density, i. e., 1000 cc. of the foam should weigh from about 40 to about 150 grams, and preferably from about 40 to about 100 grams. When the desired density is reached, an acidic gelling agent is added in amount sufficient to produce a stable gelled foam having a pH from about 2 to about 3.

There is a lapse of time between the addition of the gelling agent and the final hardening of the material, usually ten minutes or longer. In this interim it is possible to pour the material into any appropriate mold, without difficulty, even though the foam has progressively stiffened during the frothing of the emulsified resins. This is different from urea-formaldehyde per se foams, which set up quickly on addition of the hardening agent, making it difficult to cast the same without damage to the cell structure; in such case the resulting dry foam is also fragile. The chemical reaction which causes the foam to progressively stiffen as the frothing is carried out is not clearly understood. In any event, the foam becomes relatively stable, and after frothing to the desired density, will not collapse for some time, even if the gelling agent is not added.

The stable gelled foam can be hardened (polymerized) at a temperature of from about 90° F. to about 150° F., and preferably at about 130° F. The time at 130° F. is from 40 to 60 hours, and the time at the other temperatures is correspondingly shorter or longer.

The gelled foam is easily handled by preliminarily drying it for a short time, for example, from 20 to 60 minutes to best enable it to be cut as desired, before giving it the final cure or hardening. The multicellular structure and volume of the foam is not substantially affected during the drying period.

In this manner a final multicellular product can be made as light as 0.9 pound per cubic foot, and considering that cork weighs about 10 pounds per cubic foot, the merits of the product of the present invention will be easily understandable. Although products weighing less than 0.9 pound per cubic foot can be made by this invention, they are too fragile below 0.5 pound per cubic foot.

To increase the resistance to burning of the final product, polyvinyl chloride in from 5 to 20% by weight based on 100 parts of the urea resin, may be added with stirring to the emulsion before the frothing operation.

In place of urea, thiourea may be condensed with the formaldehyde, and the thiourea-formaldehyde resin may be used with or instead of the urea-formaldehyde resin.

The following example is given to illustrate the invention, without limitation thereto, the parts being by weight:

Example 1

(a) About 50 parts of methyl acrylate are emulsified with 50 parts of water containing about 1 part of isopropyl naphthalene sulfonate. One part of hydrogen peroxide is added and the emulsion heated at from about 70 to about 90° C. for about 60 to 90 minutes until a synthetic latex is formed. The methyl acrylate is partially polymerized.

(b) About 60 parts of the polyvinyl acetate are emulsified with about 40 parts of water containing about 1 part of a suitable emulsifying agent, such as a sodium salt of technical lauryl and oleyl sulfates, and the pH adjusted to about 4.5.

(c) A urea-formaldehyde resin is made by reacting urea and formaldehyde in a molar ratio of 1:2 in an aqueous solution. Sodium hydroxide is also added sufficient to maintain a pH 4 to 5. After the reaction has continued long enough (approximately 60 to 90 minutes), the resin solution is neutralized, dried and ground to a powder. The resin at this stage is water-soluble.

About 180 parts of the urea-formaldehyde condensation product powder is emulsified in about 540 parts of water containing about 4 parts of sodium salt of technical lauryl and oleyl sulfates, by rapid stirring. The stirring is continued and about 34 parts of the polymerized acrylic ester latex emulsion is added. When these materials are homogeneously mixed, about 163 parts of the polyvinyl acetate emulsion is incorporated, followed by about 43 parts of propylene dichloride. The combined resin emulsion should have a pH of from 3.5 to 6.8, and preferably from about 4 to about 5.

The emulsion containing the various resins is frothed in a Hobart mixer to the desired density, as aforesaid, and which preferably is such that 1000 cc. of the froth or foam weigh about 70 grams. When the foam has been frothed to the said density, after an interval of 10 minutes or longer, about 35 parts of an acidic gelling agent such as tartaric acid (20 parts dissolved in 80 parts of water) is added, and the mixing continued about 3 to 5 minutes. The gelling agent produces a very stable foam having a pH of from about 2 to about 3. The gelled foam may be formed into sheets of any desired thickness or placed in molds and dried without difficulty. If subjected to a temperature of about 130° F. for about 20 minutes, the gelled foam may be easily handled or cut into slabs and transferred to a drying oven.

The drying of the foam is effected at a temperature of 130° F. for about 40 to 60 hours.

The resulting product is of soft fibrous structure which is readily apparent when a surface is scratched with the finger nail. The product normally is substantially impervious to air or moisture. Part of the cells are closed. The product is impervious to air to an extent that will prevent convection. For a density of 2 pounds per cubic foot, the product has a K value less than 0.30 B. t. u./ft.²/°F./hr./in. taken at 100° F.). The product will absorb three times its weight of water after 24 hours immersion in water under 4 pounds per square inch head.

The acrylic resin may be either derived from acrylic acid or a substituted acrylic acid and includes more prominently the poly alkyl acrylates, preferably those having from 1 to 4 carbon atoms in the alkyl radical, e. g., methyl, ethyl, propyl, isopropyl, butyl, etc., as well as the corresponding poly alkacrylic esters, e. g., those derived from methacrylic acid such as methyl (or ethyl, propyl, isopropyl, butyl) methacrylate.

The acrylic resins herein are polymers of compounds of the general formula $$CH_2=\underset{\alpha}{\underset{|}{C}}-COOY$$
$$\beta$$

where X is hydrogen or alkyl, and Y is alkyl. They may further be described as polymers of alkyl esters of a mon-olefinic acid of the formula $$C_nH_{2n-1}-COOH$$

having alpha beta unsaturation (conjugated with the unsaturation of the carbonyl group), the beta carbon atom having each of its other valences attached to hydrogen.

The following proportions of the resins may be used. For every 100 parts by weight of the water-soluble urea-formaldehyde condensate (or thioureaformaldehyde condensate) sufficient of the acrylic resin emulsion is used to provide from 5 to about 25 parts of the acrylic ester; sufficient of the vinyl acetate emulsion is used so as to provide from about 30 to 90 parts of the polyvinyl acetate. Generally, the amount, by weight, of the urea resin is from 1 to 3½ times the amount of the vinyl resin and from 4 to 20 times the amount of the acrylic resin.

Any of a large number of chlorinated organic solvents other than propylene dichloride may be used, for example, such as ethylene dichloride, chloroform, monochlorobenzene, carbon tetrachloride, butyl, or amyl chloride, etc.

The term "a water-soluble urea-formaldehyde" herein, unless otherwise limited, refers to the water-soluble urea-formaldehyde as well as to the water-soluble thiourea-formaldehyde condensate.

Having thus described my invention, what I claim and desire to protect by Letters Patent is:

1. A substantially homogeneous light weight multicellular dry foam product derived from heat-hardening a stable gelled foam of an aqueous combined resin emulsion comprising, by weight, 100 parts of a water-soluble urea-formaldehyde resin selected from the class consisting of water-soluble urea-formaldehyde and water-soluble thiourea-formaldehyde resins, 30 to 90 parts of vinyl acetate resin, and 5 to 25 parts of an acrylic resin which is a polymer of an alkyl ester of an acrylic acid, which ester has the formula $$CH_2=\underset{|}{\overset{X}{C}}-COOY$$

where X is a radical selected from the group consisting of hydrogen and alkyl, and Y is alkyl.

2. A substantially homogeneous light weight multicellular resilient soft dry foam product weighing not more than 3 pounds per cubic foot derived from heat-hardening a stabilized froth of an aqueous combined resin emulsion comprising, by weight, 100 parts of a water-soluble urea-formaldehyde resin selected from the class consisting of water-soluble urea-formaldehyde and water-soluble thiourea-formaldehyde resins, 30 to 90 parts of vinyl acetate resin, and 5 to 25 parts of an acrylic resin which is a polymer of an alkyl ester of an acrylic acid, which ester has the formula $$CH_2=\overset{X}{\underset{|}{C}}-COOY$$

where X is a radical selected from the group consisting of hydrogen and alkyl, and Y is alkyl.

3. A method of making an extremely light weight multicellular product which comprises frothing an aqueous combined resin emulsion comprising, by weight, 100 parts of a water-soluble urea-formaldehyde resin selected from the class consisting of water-soluble urea-formaldehyde and water-soluble thiourea-formaldehyde resins, from 30 to 90 parts of vinyl acetate resin, 5 to 25 parts of an acrylic resin which is a polymer of an alkyl ester of an acrylic acid, which ester has the formula $$CH_2=\overset{X}{\underset{|}{C}}-COOY$$

where X is a radical selected from the group consisting of hydrogen and alkyl, and Y is alkyl, and a normally liquid chlorinated organic solvent consisting of chlorine attached to a radical selected from the class consisting of carbon and hydrocarbon, and which solvent is removable on drying the foam, setting the foam to a stable gel, and heat-curing and drying the stable gelled foam.

LAWRENCE E. DALY.

REFERENCES CITED

The following references are of record in the file of this patent:

UNITED STATES PATENTS

| Number | Name | Date |
|---|---|---|
| 2,187,383 | Ludwig | Jan. 16, 1940 |
| 2,076,295 | Curs et al. | Apr. 6, 1937 |